United States Patent [19]

Duffy

[11] Patent Number: 5,055,151
[45] Date of Patent: Oct. 8, 1991

[54] POROUS FILAMENTARY MATS AND METHOD OF MAKING SAME

[75] Inventor: Thomas P. Duffy, Des Peres, Mo.
[73] Assignee: Greenstreak Plastic Products Company, St. Louis, Mo.
[21] Appl. No.: 393,085
[22] Filed: Aug. 9, 1989

Related U.S. Application Data

[63] Continuation of Ser. No. 146,731, Jan. 21, 1988, abandoned.
[51] Int. Cl.⁵ .................. B32B 31/20; B32B 31/26
[52] U.S. Cl. .................. 156/167; 156/181; 156/296; 156/308.2
[58] Field of Search ............. 428/198, 296; 156/62.4, 156/62.6, 62.8, 285, 296, 308.2, 167, 181

[56] References Cited

U.S. PATENT DOCUMENTS

| | | | |
|---|---|---|---|
| 2,413,551 | 12/1946 | Englund | 51/135 |
| 2,473,528 | 6/1949 | Hoover | 154/101 |
| 2,522,527 | 9/1950 | Manning | 154/90 |
| 2,577,214 | 12/1951 | Slayter | 154/46 |
| 2,696,639 | 12/1954 | Meyer et al. | 18/12 |
| 3,314,840 | 4/1967 | Lloyd et al. | 156/167 |
| 3,341,394 | 9/1967 | Kinney | 161/72 |
| 3,502,763 | 3/1970 | Hartmann | 264/210 |
| 3,686,049 | 8/1972 | Manner et al. | 156/167 |
| 3,837,988 | 9/1974 | Hennen et al. | 161/67 |
| 4,351,683 | 9/1982 | Kusilek | 156/167 |
| 4,363,845 | 12/1982 | Hartmann | 428/296 |

Primary Examiner—Jenna Davis
Attorney, Agent, or Firm—Polster, Polster and Lucchesi

[57] ABSTRACT

A porous, filamentary mat has a plurality of layers that are in intimate face-to-face relation and that have portions of the confronting faces thereof bonded together to enable those layers to constitute a unitary, porous, filamentary mat. Each of the layers has a plurality of elongated filaments of thermoplastic material; and each of those filaments is arranged in an essentially horizontal attitude and is longer than the mat. Each of those filaments has a number of bends therein which cause portions of each filament to cross and to engage other portions of that filament; and those bends also cause portions of each filament to cross and to engage portions of one or more adjacent filaments. The crossing portions of each filament, and the crossing portions of adjacent filaments, are bonded together by initial thermal bonds that are subsequently enhanced; as by pressing together the adjacent crossing portions of the various filaments of the mat while they are in a tacky state, by applying additional heat to the initially-thermally-bonded filaments of the mat to cause the initial thermal bonds to form longer and deeper bond, or by applying both heat and pressure to those initial thermal bonds.

9 Claims, 1 Drawing Sheet

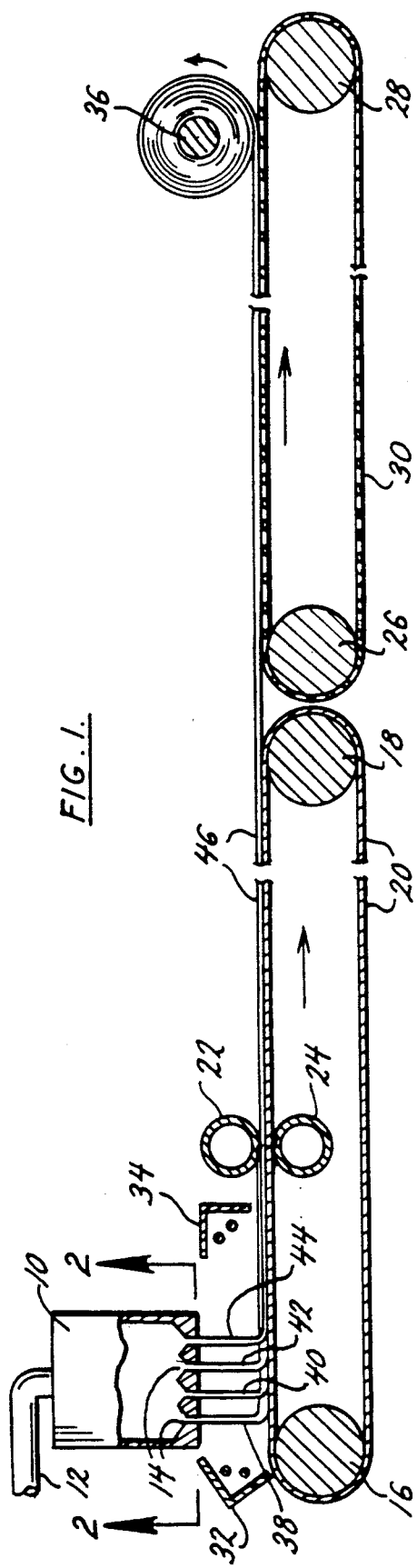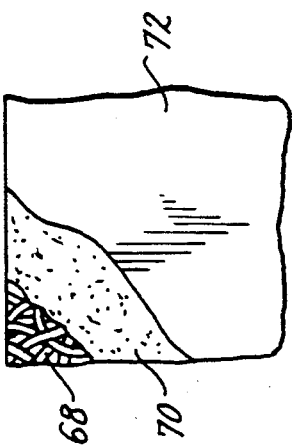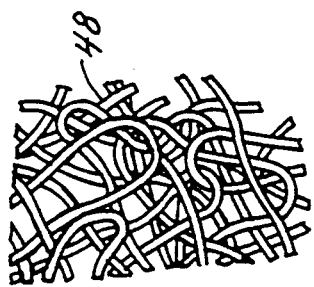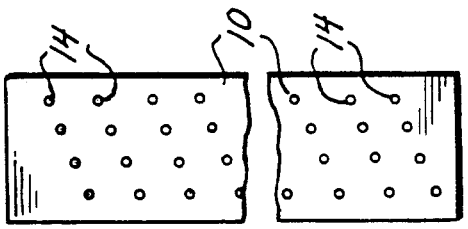

POROUS FILAMENTARY MATS AND METHOD OF MAKING SAME

This is a continuation of application Ser. No. 146,731, filed on Jan. 21, 1988, now abandoned.

BACKGROUND OF THE INVENTION

Porous, filamentary mats of thermoplastic material have been found to be useful for various purposes. For examples, porous, filamentary mats have been used as erosion-controlling mats. However, at least one porous, filamentary mat, which has been marketed for use as an erosion-controlling mat, has had an unduly high profile and has had insufficient resistance to excessive elongation in the lateral direction. Another porous, filamentary mat, which has been marketed for use as an erosion-controlling mat, has been so stiff that it could not conform to the contours of the soil which it was supposed to protect. As a result, prior porous, filamentary mats, which have been marketed as erosion-control mats, have not been satisfactory.

SUMMARY OF THE INVENTION

A porous, filamentary mat is formed by causing a plurality of rows of filaments of molten thermoplastic material to issue from an extrusion die, by causing the filaments of one of those rows of filaments to engage a transport—which is moving at a rate of speed that is much lower than the speed at which those filaments issue from that die—and thereby form a porous filamentary layer which has large numbers of crossings between portions of each filament and which also has large numbers of crossings between portions of adjacent filaments, causing the filaments of at least one further row of filaments to form a further porous, filamentary layer which overlies and abuts the first porous, filamentary layer and which has a further large number of crossings, keeping the filaments of those layers at bonding temperature until initial thermal bonds are formed at those crossings, and subsequently applying pressure and/or additional heat to lengthen and deepen, and thereby enhance, those initial thermal bonds. It is, therefore, an object of the present invention to provide a porous, filamentary mat by causing a plurality of rows of filaments of molten thermoplastic material to approach and to be underlain and supported by a transport—which is moving at a rate of speed that is much lower than the speed at which those filaments approach that transport—so those filaments form a plurality of porous, filamentary layers that have large numbers of crossings with initial thermal bonds at those crossings, and by subsequently applying pressure and/or additional heat to lengthen and deepen, and thereby enhance, those initial thermal bonds.

A porous, filamentary mat, that can be effectively marketed for use as an erosion-controlling mat, has a plurality of layers that are disposed in intimate face-to-face relation and that have portions of the confronting faces thereof bonded together to enable those layers to constitute a unitary, porous, filamentary mat. Each of those layers has a plurality of elongated filaments of thermoplastic material that are arranged in essentially horizontal attitudes; and each of those filaments is longer than the mat. Further, each filament has a number of bends therein which cause portions of that filament to cross and to engage other portions of that filament; and those bends also cause portions of each filament to cross and to engage portions of one or more adjacent filaments. The crossing portions of each filament and the crossing portions of adjacent filaments are bonded together by initial thermal bonds that are subsequently enhanced; as by pressing together the adjacent crossing portions of the various filaments of the mat while they are in a tacky state, by applying additional heat to the initially-thermally-bonded filaments of the mat to cause the initial thermal bonds to form longer and deeper bonds, or by applying both heat and pressure to those initial thermal bonds. Such a mat can be sufficiently bendable to readily conform to the contours of the soil it is to protect and can have a low profile to minimize the shifting, wrinkling or bunching forces which flowing water applies to it, and yet can be strong enough to prevent excessive elongation thereof. It is, therefore, an object of the present invention to provide a porous, filamentary mat which can be effectively used as an erosion-controlling mat and which has a plurality of face-to-face layers that are made from filaments of thermoplastic material, wherein each filament of each layer has initial thermal bonds at the crossings of portions thereof and also at crossings with portions of adjacent filaments of the same or of an adjacent layer, and wherein those initial thermal bonds are subsequently changed to enhanced bonds.

The present invention can make the porous, filamentary mat thereof sufficiently bendable, sufficiently porous, and thin enough to be used as an erosion-controlling mat; but it also can make that mat stiff enough and thick enough to be used as an entrance mat, and it can even make that mat so stiff that it can be used as a walkway mat. Importantly, the present invention can make that mat so it is usable as an erosion-controlling mat, as an entrance mat, or as a walkway mat without requiring any substantial changes in the structure of the mat-making machine. Specifically, the present invention uses the same filament-forming extrusion die to make the porous, filamentary mat of the present invention, whether that mat is to be used as an erosion-controlling mat, an entrance mat, or a walkway mat. Also, the present invention uses the same filament-receiving and mat-forming transport to make the porous, filamentary mat of the present invention, whether that mat is to be used as an erosion-controlling mat, an entrance mat, or a walkway mat. All a user of the present invention need do to make the porous, filamentary mat of that invention usable as an erosion-controlling mat, an entrance mat, or as a walkway mat is to vary the speed of the transport to vary the filament-to-mat/length ratio, to vary the amount and placement of the heat, and to determine whether to use pressure, in forming the enhanced bonds. As a result, the present invention makes it possible to produce a porous, filamentary mat that can be used as an erosion-controlling mat, as an entrance mat or as a walkway mat with essentially the same structure, with minimum factory space, and with minimal adjustments in structure and procedure. It is, therefore, an object of the present invention to provide a structure which can be used to selectively produce a porous, filamentary erosion-controlling mat, a porous, filamentary entrance mat, or a porous, filamentary walkway mat.

By using a predetermined average filament-to-mat/-length ratio, and by using pressure to enhance the initial thermal bonds of the resulting filamentary mat, the present invention can, provide a good erosion-controlling mat. By providing a higher average filament-tomat/length ratio, and by using little or no pressure to enhance the initial thermal bonds of the resulting filamentary mat, the present invention can provide a good entrance mat; and by providing an even higher average filament-length-to-mat-length ratio, and by using pressure to enhance the initial thermal bonds of the resulting filamentary mat, the present invention can provide a good walkway mat. It is, therefore, an object of the present invention to vary the average filament-to-mat/length length ratio of a porous, filamentary mat and to selectively use pressure to enhance the initial thermal bonds of the resulting filamentary mat, to form an erosion control mat, to form an entrance mat, or to form a walkway mat.

The erosion-controlling mat of the present invention is made readily bendable by making that mat with an average filament-to-mat/length ratio in the range of two to five (2-5); because filament-to-mat/length ratios in that range provide relatively-large open spaces between the bonded crossings of portions of the various filaments in the layers of the mat. Yet, filament-to-mat/length ratios in that range provide a sufficiently large number of bonded crossings, per unit of length of the mat, to enable that mat to prevent excessive elongation of that mat. It is therefore, an object of the present invention to provide an erosion-controlling mat that is readily bendable by making that mat with an average filament-to-mat/length ratio in the range of two to five (2-5).

The erosion-controlling mat of the present invention is given a low profile—to enable it to readily permit water to flow over it in a laminar flow manner rather than in a turbulent flow manner—by applying compressive forces to that mat while the initial thermal bonds at the crossings of that mat are at bonding temperature. Those compressive forces also increase the resistance of the erosion-controlling mat to excessive elongation by converting those initial thermal bonds to enhanced bonds. It is, therefore, an object of the present invention to provide an erosion-controlling mat that has a low profile and that can resist excessive elongation thereof by applying compressive forces to that mat while the initial thermal bonds at the crossings of that mat are of bonding temperature.

The present invention provides a filamentary entrance mat which is porous, which has an attractive appearance, and which can withstand the shuffling motion that persons use when they try to free their shoes from mud, snow and other undesired materials. The present invention provides such a mat by making that mat with an average filament-to-mat/length ratio in the range of five to ten and one-half (5-10.5). Average filament-to-mat/length ratios in that range enable the filaments in the upper layer of the mat to form ornamental configurations of pleasing appearance. In addition, filament-to-mat/length ratios in that range enable the resulting porous, filamentary mat to be thick enough to absorb the mud, snow and other undesired materials from persons, shoes, and also to have a large number of crossings with initial thermal bonds that can subsequently be enhanced. As a result, the entrance mat of the present invention can absorb mud, snow and other undesired materials from persons, shoes, and also can withstand the shuffling motion which persons use when they try to free their shoes from such mud, snow and other undesired materials. It is, therefore, an object of the present invention to provide a porous, filamentary, entrance mat by using filament-to-mat/length ratios in the range of five to ten and one-half (5-10.5).

The present invention provides a filamentary mat, which is porous and yet which is stiff enough and sturdy enough to be used as a walkway on roofs and on other exposed places, by making that mat with an average filament-to-mat/length ratio in the range of seven to ten and one-half (7-10.5). Average filament-to-mat/length ratios of that magnitude enable the mat to be thick enough and dense enough to serve as a walkway on roofs and on other exposed places and yet be porous; and, when the initial thermal bonds of that mat are subsequently enhanced by compressive forces, that mat can support heavy loads and the impact of work shoes without experiencing any impairment thereof, and also can resist the raveling forces that can be applied by the wheels of turning vehicles. It is, therefore, an object of the present invention to provide a porous, walkway mat by using filament-to-mat/length-length ratios in the range of seven to ten and one-half (7-10.5).

Other and further objects and advantages of the present invention should become apparent from an examination of the drawing and accompanying description.

In the drawing and accompanying description, a preferred embodiment of the present invention is shown and described, but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a broken, diagramatic view of one preferred embodiment of structure that is used in making the various mats of the present invention, FIG. 2 is a broken, bottom view, on a large scale, of the extrusion die shown in FIG. 1, FIG. 3 is a plan view of a portion of one erosion-controlling mat that is made in accordance with the principles and teachings of the present invention, FIG. 4 is an edge elevational view of the mat of FIG. 3, FIG. 5 is a plan view of a portion of an entrance mat that is made in accordance with the principles and teachings of the present invention, FIG. 6 is an edge elevational view of the mat of FIG. 5, FIG. 7 is a bottom view of a portion of a walkway mat that is made in accordance with the principles and teachings of the present invention, and FIG. 8 is an edge elevational view of the mat of FIG. 7.

Referring to the drawing in detail, the numeral 10 denotes an extrusion die of standard and usual form. An inlet 12 supplies molten thermoplastic material to that extrusion die; and that molten thermoplastic material then issues from ports 14 in the bottom face of that die to form four (4) elongated rows of thermoplastic filaments. The filaments in the left-hand row of thermoplastic filaments are denoted by the numeral 38, the filaments in the second-from-the-left row are denoted by the numeral 40, the filaments in the second-from-the-right row are denoted by the numeral 42 and the filaments in the right-hand row are denoted by the numeral 44. As shown particularly by FIG. 2, the ports 14 are staggered so the filaments in adjacent rows are in echelon. As a result, each filament is displaced laterally from every other filament that is supplied by the ports 14 of extrusion die 10.

The numeral 16 denotes an elongated pulley which is located below the level of the extrusion die 10; and the numeral 18 denotes a further elongated pulley which is displaced from, but is at essentially the same level as, the pulley 16. One or the other of the pulleys 16 or 18 is driven; and the other will be driven by an endless flexible belt 20 which extends around those pulleys. That belt has an outer surface which is made from a plastic material that is smooth and that can readily withstand high temperatures. The belt 20 is a purchased component and is not, per se, a part of the present invention. The upper run of that belt preferably is spaced less than a foot below the bottom face of the extrusion die 10; and that upper run moves from left to right in FIG. 1.

The filaments in the elongated rows of filaments 38, 40, 42 and 44 respond to gravity and to the momentum, which is given them as they are forced through the ports 14, to rapidly approach the upper run of the belt 20. The rate at which the upper run of that belt moves from left to right is substantially less than the rate at which the filaments are extruded from the ports of the die 10; and hence the filaments of the row of filaments 38 will form a number of bends therein as they engage and are supported by the upper run of the belt 20. The filaments of the row of filaments 40 will form a large number of bends therein as they come to rest upon, and in part sink down into the spaces between the bends of, the filaments from the row of filaments 38. Similarly, the filaments of the row of filaments 42 will form a large number of bends therein as they come to rest upon, and in part sink down into the spaces between the bends of, the filaments of the rows of filaments 38 and 40. Finally, the filaments of the row of filaments 44 will form a large number of bends therein as they come to rest upon, and in part sink down into the spaces between the bends of, the filaments of the rows of filaments 38, 40 and 42. As the filaments of the various rows of filaments form bends therein, each filament will have portions thereof cross other portions thereof, and also will have portions thereof cross portions of adjacent filaments from the same or adjacent rows of filaments. As those crossings are formed, the thermoplastic material of the filaments will be hot enough to form initial thermal bonds at those crossings, whether those crossings are between portions of the same filament or are between portions of adjacent filaments from the same or adjacent rows. However, the temperature of the thermoplastic material of all of the filaments will be low enough so none of those filaments will bond to the surface of the upper run of the belt 20. As a result, the filaments from the rows of filaments 38, 40, 42 and 44 will form a plural-layer mat that will become a thermally-bonded unitary mat which is freely separable from the upper run of the belt 20.

The present invention can vary the patterns which the bends in the various filaments, from the rows of filaments 38, 40, 42 and 44, form as they are underlain and supported by the upper run of the belt 20. By positioning the ports 14 within a few inches of that upper run, the present invention can provide essentially-regular loop configurations for the filaments from the rows of filaments 38, 40, 42 and 44. By positioning those ports much further from the upper run of the belt 20, the present invention can provide patterns of highly-irregular and constantly-changing configurations. Those ports can be positioned at any desired number of distances from that upper run to provide various configurations for the filaments as they are underlain and supported by that upper run. However, when the ports 14 are spaced a considerable distance from the upper run of the belt 20, heat should be supplied to the filaments of the rows of filaments 38, 40, 42 and 44 to make sure that initial thermal bonds form at the crossings which are created by the bends in those filaments.

An elongated heat source 32, which includes two elongated heating elements and a reflector, is mounted to the left of the row of filaments 38. That heat source directs heat toward the filaments of the row of filaments 38, and also toward the filaments in the rows of filaments 40, 42 and 44. That heat helps the filaments in those rows of filament to be hot enough, despite the cooling effect of their passage to, and their interception by, the upper run of the belt 20, to provide initial thermal bonds between the crossings of each filament and also between the crossings of each filament with adjacent filaments from the same or adjacent rows of filaments.

The initial thermal bonds at the crossings of the filaments of each filamentary mat, that are formed by the present invention, will integrate the layer formed by the filaments of the row of filaments 40 with the layer formed by the filaments of the row of filaments 38, will integrate the layer formed by the filaments of the row of filaments 42 with the layers formed by the filaments of the rows of filaments 38 and 40, and also will integrate the layer formed by the filaments of the row of filaments 44 with the layers formed by the filaments of the rows of filaments 38, 40 and 42. In this way, the layers form an integrated mat which is generally denoted by the numeral 46 in FIG. 1.

The present invention enhances those initial thermal bonds to enable each filamentary mat that is formed by the present invention to be rugged and sturdy, so it can withstand even careless or reckless handling during storage, shipment and installation. The enhancement of the initial thermal bonds can be effected by applying pressure to the porous, filamentary mats while the crossings are at bonding temperature, by applying additional heat, or by applying additional heat and pressure. In each instance, the enhancement of the initial thermal bonds will produce longer and deeper, and hence stronger, thermal bonds.

Where the porous, filamentary mat provided by the present invention is to be used as an erosion-controlling mat, the initial thermal bonds of that porous filamentary mat will be enhanced by compressive forces which an elongated roller 22 applies to the top layer of that mat and which an elongated roller 24 causes the upper run of the belt 20 to apply to the bottom layer of that mat. Those compressive forces will not only increase the lengths and depths of those bonds, but they will provide a low profile for that mat. For example, those compressive forces will cause the height of the mat 46 to be less than N times D, where N is the maximum number of crossings in essentially-vertical registry at any point on the mat, and D is the average diameter of the filaments in the various layers in that mat. In one preferred embodiment of four-layer, erosion-controlling mat provided by the present invention, the maximum height was one hundred and ten thousandths (0.110) of an inch, whereas N was four (4) and D was forty thousandths (0.040) of an inch; and hence N times D was one hundred and sixty thousandths (0.160) of an inch.

Where the porous, filamentary mat provided by the present invention is to be used as an entrance mat, the initial thermal bonds of that porous filamentary mat will be enhanced by additional heat from a heat source 34, which includes two elongated heating elements and a reflector and which is mounted to the right of the right-hand side of the extrusion die 10. That additional heat is directed at the upper surface of the integrated mat 46; adjacent to the areas where the filaments of the rows of filaments 38, 40, 42 and 44 merge; and that additional heat will cause the initial thermal bonds at the crossings of the filaments of that mat to soften and to form longer and deeper, and hence stronger, thermal bonds. Also, that additional heat will reduce the height of the mat 46—the greater the amount of additional heat, the greater the reduction in height. In one preferred embodiment of four-layer, entrance mat provided by the present invention, the maximum height was two hundred and seventy-seven thousandths (0.277) of an inch, whereas N was eight (8) and D was forty thousandths (0.040) of an inch; and hence N times D was three hundred and twenty thousandths (0.320) of an inch.

Where the porous filamentary mat provided by the present invention is to be used as a walkway mat, the initial thermal bonds of that porous filamentary mat will be enhanced by compressive forces which the elongated roller 22 applies to the top layer of that mat and which the elongated roller 24 causes the upper run of the belt 20 to apply to the bottom layer of that mat. Those compressive forces will not only increase the lengths and depths of those bonds, but they will provide a relatively low profile for that mat. Those elongated rollers will, however, be spaced further apart than they are spaced when they apply compressive forces to an erosion-controlling mat. In one preferred embodiment of four-layer, walkway mat provided by the present invention, the maximum height was two hundred and forty-three thousandths (0.243), whereas N was eight (8) and D was forty thousandths (0.040) of an inch; and hence N times D was three hundred and twenty thousandths (0.320) of an inch. Different thicknesses can be provided for walkway mats by varying the distances between the rollers 22 and 24.

The mat 46 will cool as it is moved along by the upper run of the belt 20; and it will experience additional cooling as it is moved along by the upper run of a perforated belt 30. The latter belt is supported and driven by elongated pulleys 26 and 28; and one of those pulleys is a driving pulley whereas the other is a driven pulley. By the time the mat 46 has been moved close to a pickup roller 36, it will be essentially tack-free; and hence it can be wound around that pickup roller without becoming stuck to that roller. When a desired length of mat has been wound around the pickup roller 36, that length of mat can be cut off; and a bare pickup roller can be substituted for the full pickup roller. The erosion-controlling mats of the present invention are offered commercially in lengths of one hundred and fifty (150) feet; and each filament in such a mat is very much longer than the length of that mat. Although only a very short section of a length of an erosion-controlling mat 48 is shown in FIG. 3, almost every filament in that view is shown as having crossings between various portions thereof and also as having crossings with portions of adjacent filaments. However, as shown by FIG. 3, the erosion-controlling mat 48 has a high degree of porosity, and hence can permit grass to grow up through it. Also, where the average diameter of the filaments in that mat is forty thousandths (0.040) of an inch, that mat permits ample sunlight to pass through it, and it does not require any appreciable deflection of a blade of grass to pass through it.

The preferred form of erosion-controlling mat provided by the present invention has a lengthwise elongation index in the range of seventy-five to one hundred and ten percent (75–110%) and a transverse elongation index in the range of sixty to one hundred percent (60–100%); as determined by the ASTM D-1682-64 testing method. Those indices were obtained by a test wherein specimens of erosion-controlling mat were gripped by jaws that were initially spaced apart three (3) inches, and were then moved further apart at a rate of twelve (12) inches per minute. That erosion-controlling mat has a bending factor of three inches to five inches (3–5); and that factor is the actual length of a twelve-inch wide strip of that mat which must be moved, in cantilever fashion, over a straight edge until the end of that strip bends down into engagement with a planar surface which extends forwardly and downwardly from that straight edge at an angle of forty-one and one-half (41.5) degrees. Such an erosion-controlling mat can readily flex and bend to follow the contours of the soil which it is to protect, and yet be sufficiently resistant to elongation in the transverse direction to avoid the rippling, wrinkling and bunching which is experienced during the use of at least one prior, filamentary, erosion-controlling mat. That prior erosion-controlling mat has a transverse elongation index which is considerably greater than one hundred percent (100%); and the profile of that erosion-controlling mat is higher than the profile of the erosion-controlling mat 48. This means that the prior, filamentary, erosion-controlling mat is subjected to more total laterally-directed extension forces than is the erosion-controlling mat 48, and its resistance to transverse elongation is less than that of the mat 48; and hence the erosion-controlling mat 48 avoids the rippling, wrinkling and bunching which occurs in that prior, filamentary, erosion-controlling mat.

Whenever an entrance mat 58 is to be formed, the number of rows of filaments, the number of filaments per row, and the extrusion rate are the same as the numbers and rate which are used when an erosion-controlling mat is formed. However, the speed of the upper run of the belt 20 is sharply reduced—the filament-to-mat/length ratio being in the range of five to ten and one-half (5–10.5) when an entrance mat is being formed, whereas the filament-to-mat/length ratio is in the range of two to three and one-half (2–3.5) when an erosion-controlling mat is being formed. As a result, the thickness is and densities of entrance mats 58 are very much greater than the thickness and density of the erosion-controlling mat 48.

As the filaments of the row of filaments 38 form a layer on the upper run of the belt 20, as the filaments of the row of filaments 40 form a layer atop that first layer, as the filaments of the row of filaments 42 form a layer atop the first two layers, and as the filaments of the row of filaments 44 form a layer atop the first three layers, each filament will have large numbers of bends therein; and hence the mat 58 will have many crossings. As those crossings are formed, initial thermal bonds will be formed; and those bonds will subsequently be enhanced by heat from the heat source 34. The enhanced bonds will be longer and deeper, and hence stronger, than the initial thermal bonds. Also, the additional heat from the heat source 34 will provide a glossy finish for the filaments in the upper layer of the entrance mat 58. Consequently, the entrance mat of the present invention has an attractive appearance, will be porous enough to absorb mud, snow and other undesirable materials from persons, shoes, and yet will fully resist the forces that are generated by the shuffling motion which persons apply to their shoes when they try to rid them of mud, snow and other undesirable materials.

Whenever a walkway mat 68 is to be formed, the number of rows of filaments, the number of filaments per row, and the extrusion rate are the same as the numbers and rate which are used when an erosion-controlling mat is formed. However, the speed of the upper run of the belt 20 is sharply reduced—the filament-to-mat/length ratio being in the range of seven to ten and one-half (7–10.5) when a walkway mat is being formed, whereas the filament-to-mat/length ratio is in the range of two to three and one-half (2–3.5) when an erosion-controlling mat is being formed. As a result, the thickness and density of the walkway mat 68 are very much greater than the thickness and density of the erosion-controlling mat 48.

As the filaments of the row of filaments 38 form a layer on the upper run of the belt 20, as the filaments of the row of filaments 40 form a layer atop that first layer, as the filaments of the row of filaments 42 form a layer atop the first two layers, and as the filaments of the row of filaments 44 form a layer atop the first three layers, each filament will have large numbers of bends therein; and hence the mat 68 will have many crossings. As those crossings are formed, initial thermal bonds will be formed; and those bonds will subsequently be enhanced by compressive forces from the rollers 22 and 24. The spacing between those rollers will be greater than it is when an erosion-controlling mat 48 is to be formed; because the overall thickness of a walkway mat is considerably greater than that of an erosion-controlling mat. The enhanced bonds will be longer and deeper, and hence stronger, than the initial thermal bonds. The compression of the layers of the mat 68 will reduce, but will not eliminate, the porosity of that mat. This is important; because that porosity enables water to work its way downwardly and sideways through that mat rather than being dammed up behind that mat—as is the case where a non-pervious walkway is used.

Referring particularly to FIGS. 7 and 8, the numeral 70 denotes a strip of adhesive material which is applied to the bottom surface of the mat 68; and the numeral 72 denotes a strip of treated paper or plastic material which can be readily separated from the adhesive strip 70. The strip 72 completely covers the adhesive strip 70, and thereby makes it possible to freely handle the walkway mat 68 during the shipping of that walkway mat, and also during the placement of that walkway mat adjacent to the position which it will occupy on a roof or other site. Immediately prior to the application of the walkway mat 68 to the roof, the strip 72 will be pulled away to expose the adhesive strip 70, and then the walkway mat 68 will be turned over to cause that adhesive strip 70 to engage, and to adhere to, the roof.

The strip 70 of adhesive material can be applied to the bottom layer of the walkway mat 68 by a standard and usual adhesive-applying machine. The pull-free strip 72 will preferably be moved into engagement with the adhesive strip 70 by feed rollers of standard and usual design and construction. The porosity of the walkway mat 68 enables the adhesive for the strip 70 to penetrate into, but not pass through, that walkway mat. As a result, the adhesive strip 70 is solidly locked to the mat 68, and hence can solidly lock that mat to a roof or other surface.

The entrance mat 58 and the walkway mat 68 can be made in the form of rolls or can be made as short lengths which facilitate the handling and installation of those mats. In one preferred embodiment of the present invention, the walkway mats are made as three foot by four foot (3'×4') mats.

In the foregoing description, the initial thermal bonds of the erosion-controlling mat 48 and of the walkway mat 68 were enhanced by compressive forces; and the initial thermal bonds of the entrance mat 58 were enhanced by added heat to provide fusion bonding. If desired added heat of different magnitudes, as well as different compressive forces resulting from different spacings between the rollers 22 and 24, could be used to enhance the initial thermal bonds of the erosion-controlling mat 48 and of the walkway mat 68. Also, if desired, differing compressive forces as well as differing magnitudes of added heat could be used to enhance the initial thermal bonds of the entrance mat 58.

If desired, additional heat sources could be used with the machine of FIG. 1; and those heat sources could extend lengthwise or transversely of the upper run of the belt 20. If the bonds, at the crossings of any filaments of any portion of the mat 46, were consistently less strong than they should be, one or more additional heat sources could be provided to direct heat toward those areas of the upper run of the belt 20 where those portions are formed.

Various materials could be used in making the erosion-controlling mat 48, the entrance mat 58 and the walkway mat 68; but each of those materials should be a thermoplastic material which is resistant to ultra violet light, to extreme high and low temperatures, to water, to algae, and to other conditions encountered by erosion-controlling mats, entrance mats and walkway mats. Some materials that can be used in making such mats are plasticized polyvinyl chloride, polyethylene, and thermoplastic rubber. Where plasticized polyvinyl chloride is used, the temperature of that plasticized polyvinyl chloride, as it passes from the ports 14, should be in the range of three hundred to three hundred and fifty (300–350) degrees Fahrenheit.

Different speeds can be provided for the belt 20 when it is desirable to provide entrance mats of different thicknesses. Whenever the speed of the belt 20 is at the high end of the range of speeds used in making entrance mats, the heat source 34 will be set to supply more heat that it will be set to supply when the belt speed is at the low end of the range of speeds used in making entrance mats. The slower the speed of the belt 20, the thicker the entrance mat will be.

If desired, patterns can be impressed into the upper surfaces of the entrance mat 58 and of the walkway mat 68. Heat and pressure will preferably be used simultaneously during the formation of such patterns. Where desired, those patterns can include deep indentations into the upper surfaces of those mats.

The enhanced thermal bonds of the present invention are much stronger than initial thermal bonds, and hence make the plural-layer, porous, filamentary mats 48, 58 and 68 quite strong. For example, the separation factor—which is the force needed to break a bond—runs from twenty to forty percent (20–40%) higher in the average enhanced bond than it does in the average initial thermal bond.

The enhanced thermal bonds provided by the present invention interlock the filaments of each layer to each other. In addition, those enhanced thermal bonds interlock the layers of each of the mats 48, 58 and 68 to each other. As a result, those mats are free from looseness between the crossings in the upper and lower layers thereof. Also those enhance thermal bonds provide important and valuable strengths for the mats, without any need of using a plastisol, a cement or any other bonding agent; thereby avoiding the reductions in porosity, the added cost in time and materials and labor, and the unsightliness which result from the use of a plastisol, a cement or any other bonding agent.

Whereas the drawing and accompanying description have shown and described a preferred embodiment of the present invention, it should be apparent to those skilled in the art that various changes may be made in the form of the invention without affecting the scope thereof.

What I claim is:

1. A method of making a plural-layer, porous, filamentary mat which consists essentially of forming a plurality of rows of fluid thermoplastic filaments and causing the filaments of said plurality of rows of filaments to approach and to be underlain and to be temporarily supported by a support which carries said filaments with it to cause the filaments of one of said plurality of rows of filaments to form a filamentary layer that overlies and engages said support and to cause the filaments of a further of said plurality of rows of filaments to form a further filamentary layer which overlies and engages the first said filamentary layer, moving said support at a rate of speed which is less than the rate at which said filaments of said plurality of rows of filaments approach said support so said filaments of said plurality of rows of filaments form bends as said filaments form said first said and said further filamentary layers, causing said bends to create crossing between portions of each said filament and also to create crossings between portions of each said filament and portions of adjacent filaments, supplying sufficient heat to said filaments of said plurality of rows of filaments to cause said filaments to be at bonding temperature as they form said crossings so initial thermal bonds automatically form at each of said crossings, and subsequently enhancing the initial thermal bonds of the crossings of said filaments of said plurality of rows of filaments by producing deeper and longer bonds of said crossings requiring a substantially greater force to separate said filaments than said initial thermal bonds throughout said filament mat, the enhancing of said initial thermal bonds to produce said deeper and longer bonds being accomplished by remolding the bonds of said crossings into said deeper and longer bonds while said crossings are at bonding temperature 2. A method as claimed in claim 1 wherein the enhancing of said initial thermal bonds is accomplished by remolding through applying additional heat to the crossings of the uppermost filamentary layer of said plural-layer, porous, filamentary mat while said crossings are at bonding temperature.

3. A method as claimed in claim 1 wherein the enhancing of said initial thermal bonds is accomplished by remolding through applying compressive forces to the crossings of said filamentary layers of said plural-layer, porous, filamentary mat while said crossings are at bonding temperature.

4. A method as claimed in claim 1 wherein the enhancing of said initial thermal bonds is accomplished by remolding through applying additional heat to the crossings of the uppermost filamentary layer of said plural-layer, porous, filamentary mat while said crossings are at bonding temperature and by also applying compressive forces to the crossings of said filamentary layers of said plural-layer, porous, filamentary mat while said crossings are at bonding temperature.

5. The method as defined in claim 1 wherein the rate of speed at which said support is moved being a relatively slow speed to cause said plural-layer, porous, filamentary mat to be thick enough and stiff enough to serve as a walkway mat.

6. The method as defined in claim 1 wherein the rate of speed at which said support is moved being a relatively fast speed to cause said plural-layer, porous, filamentary mat to be thin enough and flexible enough to serve as an erosion-controlling mat.

7. The method as defined in claim 1 wherein said porous, filamentary mat has an average filament-to-mat/length ratio in the range of two to three and one half (2–3.5), whereby said porous, filamentary mat is usable as an erosion-controlling mat.

8. The method as defined in claim 1 wherein said porous, filamentary mat has an average filament-to-mat/length ratio in the range of five to ten and one-half (5–10.5) whereby said porous, filamentary mat is usable as an entrance mat.

9. The method as defined in claim 1 wherein said porous, filamentary mat having an average filament-to-mat/length ratio in the range of seven to ten and one-half (7–10.5), whereby said porous, filamentary mat is used as a walkway mat.

* * * * *